Patented June 4, 1929.

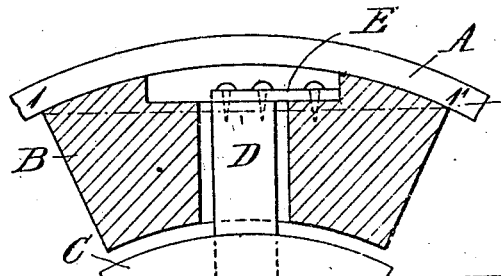
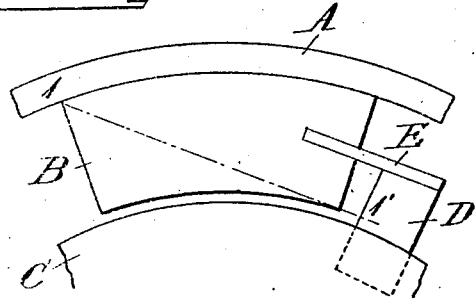
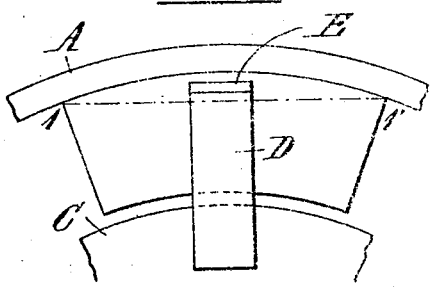
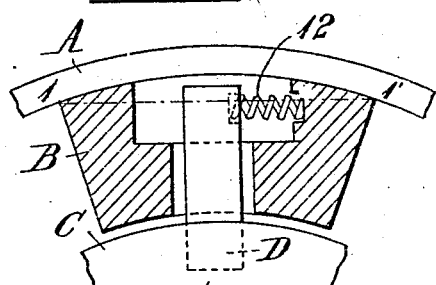
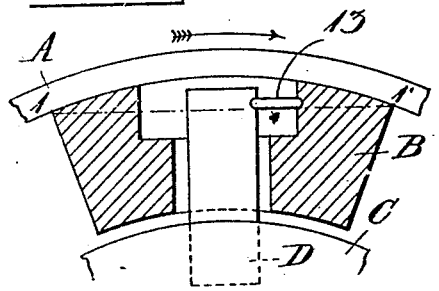
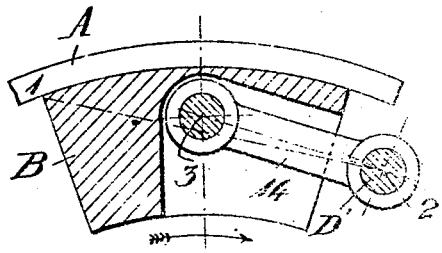

1,715,807

UNITED STATES PATENT OFFICE.

KARL JOHAN WERSÄLL, OF STOCKHOLM, SWEDEN, ASSIGNOR TO AMERICAN KAMBI COMPANY, OF NEW YORK, N. Y., A CORPORATION OF DELAWARE.

CENTRIFUGAL FRICTION CLUTCH.

Application filed April 23, 1927, Serial No. 185,961, and in Germany May 1, 1926.

The present invention is an improvement upon that shown and described in my pending application, Serial No. 745,727, filed October 24, 1924, in which centrifugal friction clutch the inner point of the contact surface between the centrifugal body or shoe and the driver pin must lie in or outside the intersection of a plane considered from the rear contact point of the friction shoe or body with the friction track at right angles to said guiding and contact surface.

In the present improvement, for the transmission of the rotation of the driver to the friction body, an interchangeable spring, pin, disc or the like is arranged between the driver and the friction body, so that the pressure of the same against the drum of the driven part of the clutch is distributed more advantageously, and these springs or mechanical devices are so arranged in relation to the friction shoes that at the rotation of the shoes they tend to press the same against or draw them away from the friction track in order to raise or lessen or wholly release the friction power.

The invention is shown in the accompanying drawings, in which—

Figure 1 shows a side view of a clutch with the driver pin arranged inside the friction shoe;

Figs. 2 and 3 show other forms with the pin outside of the friction shoe;

Figs. 4 and 5 show two clutches with the driver pin inside the shoes, Fig. 4 showing a spiral spring and Fig. 5 a pin, disc or the like for transmitting the rotating movement to the shoe;

Fig. 6 is a part sectional view illustrating the shoe connected with the driver by a link in a manner similar to that shown in Fig. 6 of my aforesaid application.

In the form shown in Fig. 1 the driver pin D, which is fastened to the driving hub C, is located inside the friction shoe B adapted to contact or slide against the drum A. The rotation of the driver pin D is transmitted to the friction shoe B by means of a flat spring E secured to the pin D and the shoe B, and it is important to the satisfactory performance of the parts that the outmost part of the springy section of the spring lies outside of a line drawn from the rear end of the contact surface of the shoe with the drum and parallel to the direction of the pull or push,—i. e., the line 1—1'.

In Figs. 2 and 3 the driver pins D are arranged on the outside of the shoe; in Fig. 2 the driver pin is shown forward of the shoe, while in Fig. 3 it is shown at the side thereof.

In Figs. 4 and 5 the driver is arranged inside of the shoe, which is given its rotation—in Fig. 4 by a spiral spring 12 and in Fig. 5 by a pin or disc 13 or the like. The spiral spring 12 and the pin 13 are so located that their outmost parts are outside of a line drawn from the rear contact edge 1 of the shoe with the drum parallel to the direction of the pull or push,—i. e., outside of the line 1—1'.

In the various views it will be observed that the driver pin D and shoe are located in lapping relation but spaced from each other, with the connecting means therebetween separable from the shoe and bridging such space.

The spring shown in Figs. 1-3 must be considered as a link of infinite length with the driver arranged for pulling or pushing, this referring to the springy part of the spring. When such a spring is used, it is mainly the outer fibers that are under strain, so that the critical point is in the outermost fibers.

As hereinbefore set forth, by the use of the spring or flexible connection which must be of heat resisting material between the driver pin and the shoe, the pressure of the shoe against the drum or driven part of the clutch is more advantageously distributed and consequently the life of the clutch is very much prolonged, for the reason that in practice the engagement of the shoe at the front end thereof with the driven member is very much greater than at the rear end thereof—in fact, the pressure at the front end is about eight times that at the rear end—so that in the constant rotation of the parts, the shoe tends to wear off more quickly at the front end than at the rear end, leaving the shoe of wedge-shaped form; but by means of this spring or flexible connection between the shoe and the pin, this wear is very materially decreased, for the reason that the spring or flexible connection between the pin and the shoes resists the centrifugal force at the front end of the shoe to a certain extent and consequently equalizes the pressure over the entire shoe and so prevents the wear at the front end of the shoe. In other words, the spring or flexible connection between the shoe and the pin resists the centrifugal force at the front end of the shoe so as to relieve the excessive pressure on the shoe at this point and, therefore, more nearly equalizes the frictional or engagement pressure of the shoe on the driven member; in fact, this connection between the pin and shoe can be so made that the pressure at the front end is slightly less than at its rear, which may sometimes be desired.

The details of the friction clutch can naturally be varied in different ways, without departing from the principle of the invention.

I claim as my invention:

1. A centrifugal friction clutch comprising a driving means including a pin, a driven means, a friction shoe, said pin and shoe being spaced one from the other, and means separable from the shoe and bridging said space and connecting the shoe with the pin and having part thereof lying outside of a line drawn from one end of the contact surface of the shoe with the driven means and running parallel to the direction of the pull or push of the shoe.

2. A centrifugal friction clutch comprising a driving means including a pin, a driven means, a friction shoe, said pin and shoe being spaced one from the other, and means separable from the shoe and bridging said space and connecting the shoe with the pin and having part thereof lying outside of a line drawn from the rear end of the contact surface of the shoe with the driven means and running parallel to the direction of the pull or push of the shoe.

3. A centrifugal friction clutch comprising a driving means including a pin, a driven means, a friction shoe, said pin and shoe being spaced one from the other, and means separable from the shoe and bridging said space and connecting the shoe with the pin and having part thereof lying outside of a line drawn from the rear to the front ends of the contact surface of the shoe with the driven means.

4. A centrifugal friction clutch comprising a driving means, a driven means, a friction shoe, and means connecting the shoe with the driving means and having part thereof lying outside of a line drawn from one end of the contact surface of the shoe with the driven means and running parallel to the direction of the pull or push of the shoe, said connecting means comprising a flexible heat resisting means.

5. A centrifugal friction clutch comprising a driving means, a driven means, a friction shoe, and means connecting the shoe with the driving means and having part thereof lying outside of a line drawn from one end of the contact surface of the shoe with the driven means and running parallel to the direction of the pull or push of the shoe, said connecting means comprising a spring.

6. A centrifugal friction clutch comprising a driving means, a driven means, a friction shoe, and means connecting the shoe with the driving means and having part thereof lying outside of a line drawn from the rear to the front ends of the contact surface of the shoe with the driven means, said connecting means comprising a spring.

7. A centrifugal friction clutch comprising a driving means including a radially disposed pin, a driven means, a friction shoe mounted on said pin for radial movement, and means connecting the shoe with the pin and effective to impart rotative movement from the pin to the shoe.

8. A centrifugal friction clutch comprising a driving means including a radially disposed pin, a driven means, a friction shoe mounted on said pin for radial movement, and resilient means connecting the shoe with the pin and effective to impart rotative movement from the pin to the shoe.

9. A centrifugal friction clutch comprising a driving means including a radially disposed pin, a driven means, a friction shoe mounted on said pin for radial movement, and means connecting the shoe with the pin, said connecting means having a part thereof lying outside of a line drawn from one end of the contact surface of the shoe with the driven means and running parallel to the direction of the pull or push of the shoe.

10. A centrifugal friction clutch comprising a driving hub, a radially disposed pin carried thereby, a driven member, a shoe having a bore central thereof for the reception of said pin, and means connecting said pin with said shoe and effective to impart rotative movement from the pin to the shoe.

11. A centrifugal friction clutch comprising a driving hub, a radially disposed pin carried thereby, a driven member, a shoe having a bore central thereof for the reception of said pin, and means connecting said pin with said shoe and comprising a resilient member and effective to impart rotative movement from the pin to the shoe.

12. A centrifugal friction clutch comprising a driving means including a pin, a driven means, a friction shoe spaced from the pin, and means separable from the shoe and bridging said space and connecting the shoe with the pin and effective to impart rotative movement from the pin to the shoe and constructed and located to relieve the pressure of the shoe on the driven means at the front end thereof, thereby more nearly to equalize the engaging pressure over the entire shoe.

13. A centrifugal friction clutch comprising a driving means including a radially extending pin, a driven means, a friction shoe shiftable relatively to and in the direction of the length of said pin, and flexible means connecting the shoe with the pin and effective to impart rotative movement from the pin to the shoe.

14. A centrifugal friction clutch comprising a driving means including a radially extending pin, a driven means, a friction shoe spaced from the pin and located in lapping relation with and shiftable relatively to and in the direction of the length of said pin, and means connecting the shoe with the pin and separable from the shoe and bridging said space and effective to impart rotative movement from the pin to the shoe.

15. A centrifugal friction clutch comprising a driving means including a radially extending pin, a driven means, a friction shoe located in lapping relation with and shiftable relatively to and in the direction of the length of said pin, and flexible means connecting the shoe with the pin and effective to impart rotative movement from the pin to the shoe.

16. A centrifugal friction clutch comprising a driving means including a radially extending pin, a driven means, a friction shoe located in lapping relation with and shiftable relatively to and in the direction of the length of said pin, and spring means connecting the shoe with the pin and effective to impart rotative movement from the pin to the shoe.

In testimony whereof I have affixed my signature.

KARL JOHAN WERSÄLL.